Jan. 30, 1940. A. W. HERRINGTON 2,188,861
DRIVEN STEERING WHEEL AXLE STRUCTURE
Filed April 7, 1938
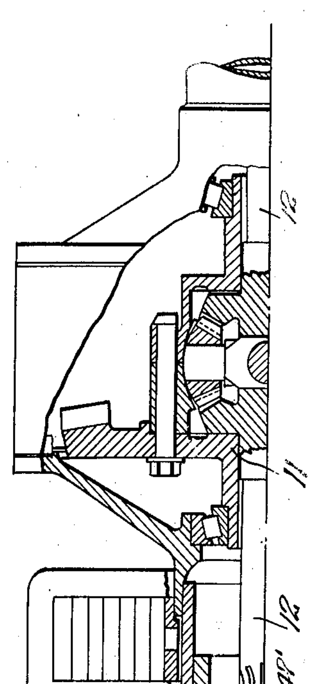
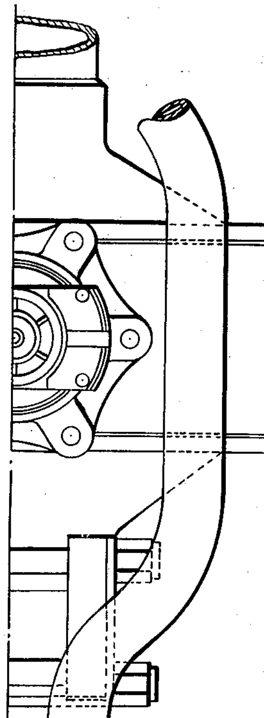
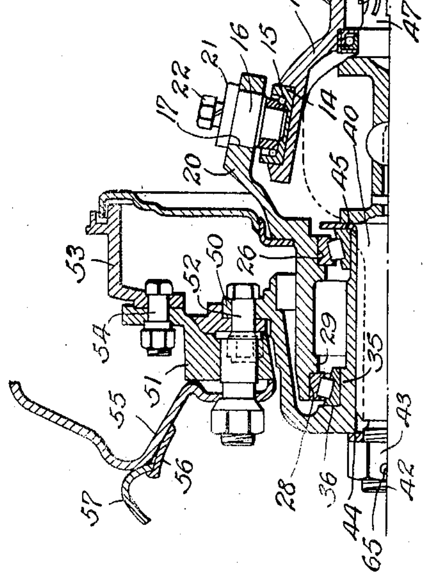
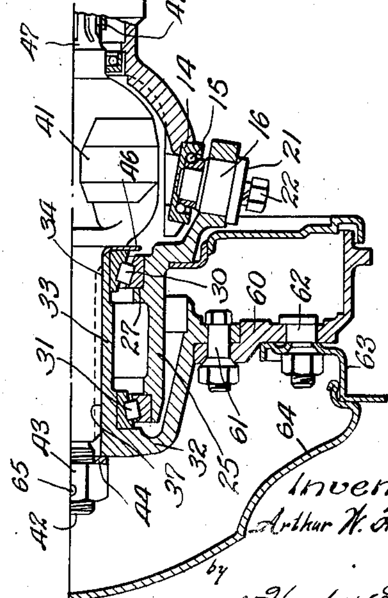
Inventor.
Arthur W. Herrington,
by Hood & Hahn.
Attorneys.

Patented Jan. 30, 1940 2,188,861

UNITED STATES PATENT OFFICE 2,188,861

DRIVEN STEERING WHEEL AXLE STRUCTURE

Arthur W. Herrington, Indianapolis, Ind., assignor to Marmon-Herrington Company, Inc., Indianapolis, Ind., a corporation of Indiana Application April 7, 1938, Serial No. 200,625

1 Claim. (Cl. 180—43)

The object of my invention is to provide improvements in details of construction of mounting and axle connection for driven steering wheels of motor vehicles.

The accompanying drawing is a fragmentary axial section of embodiments of my invention, Fig. 1 showing one form and Fig. 2 showing another form.

In the drawing, 10 indicates the main hollow body or shell of the axle structure in the middle of which is mounted the differential gearing 11 provided with the oppositely extending shaft sections 12,12. Each outer end of casing 10 carries a hollow ball like shell 13 having upper and lower bearing pockets 14, 14 in which are mounted roller bearings 15,15 receiving aligned trunnion pins 16,16. The trunnion pins 16,16 are hardened accurately formed pins, each outwardly withdrawable from pockets 17 formed with the swinging axle shell 20 and are held in place by cover plates 21 retained by cap screws 22 taking into shell 20. Shell 20 has a bearing sleeve 25 provided at its inner end with a bearing pocket 26 bottomed by flange 27 and in its outer end a bearing pocket 28 bottomed by a flange 29. Antifriction bearings 30 and 31 are mounted respectively in the bearing pockets 26 and 28. The bearing cup 32 is provided with an axial sleeve 33, the inner end of which is provided with an external bearing seat 34 upon which the inner race of bearing 30 slips and is also provided near its root with an external bearing seat 35 adapted to receive the inner race of bearing 31, said inner race seating against the shoulder 36 which flanks seat 35.

The axial bore 37 of sleeve 33 is splined to receive the splined outer shaft section 40 of the universal joint 41 preferably of the constant velocity type. The outer end of shaft 40 is threaded at 42 to receive a castled nut 43 between which the outer end of cup 32 is interposed the washer 44.

Near its inner end, shaft 40 is provided with a circumferential shoulder 45 against which the inner race of bearing 30 abuts. If desired, an oil guard ring 46 may be interposed between shoulder 45 and the inner race of bearing 30.

The inner shaft section 47 of the universal joint structure 41 is ensmalled at 48 and the outer end of each shaft section 12 is similarly ensmalled at 12′ and over these ensmalled portions is sleeved a compression spring 49, the opposite ends of which abut the outer end of shaft 12 and the inner end of shaft 47 so as to automatically but yieldingly take up the axial slack in the universal joint structure. The shaft sections 12 and 47 are drivingly connected by the spline sleeve 47′.

The cup 32 is provided with an outer peripheral flange 50 to which the main body of the wheel and the brake drum are attached. In the upper half of the drawing I show a ring 51 attached to the outer face of flange 50 by bolts 52. To the inner face of this ring is attached the brake drum 53 by bolts 54. To the outer face of ring 51 is attached the web or disc 55 of the wheel, said disc being shown only as a fragment as the details of rim form no part of my invention. Disc 55 carries spring fingers 56 adapted to retain cap 57 in place.

In Fig. 2 I show, instead of ring 51, a brake drum 60 attached to flange 50 by bolts 61. Attached to the outer face of brake drum 60 by bolts 62 is the disc 63 of a wheel, said disc being formed to receive the cap 64.

In this construction the two bearings 30 and 31 may be adjusted relatively to each other by manipulation of the nut 43, said nut being held in adjusted position, in the usual manner by the removable cotter pin 65.

I claim as my invention:

Driven steering-wheel axle structure comprising a main axle housing, a differential gearing journalled therein and having oppositely extending shaft sections, a wheel-supporting swinging axle extension trunnioned on each end of the main housing and provided at its outer end with a sleeve having internal bearing pockets, a wheel-carrying cup having an axial sleeve projected axially into each of said first-mentioned sleeves, bearings interposed between each cup-sleeve and its companion axle-extension sleeve, a universal-joint structure mounted within the housing at each trunnion and comprising oppositely-extending shaft sections one projected into the main housing with its end adjacent and rotatively connected to the outer end of a shaft of the differential and one projecting through and splined in the sleeve of the adjacent wheel-carrying cup with its outer end threaded, a nut on each of said threaded ends to engage the adjacent cup, and a companion spring interposed between each shaft of the differential and the adjacent joint-shaft.

ARTHUR W. HERRINGTON.